Jan. 4, 1966          H. SEQUIN          3,227,438
MACHINE CLAMP
Original Filed June 7, 1955
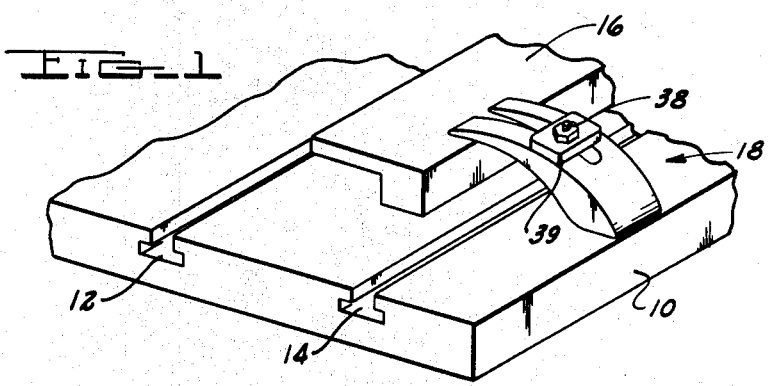
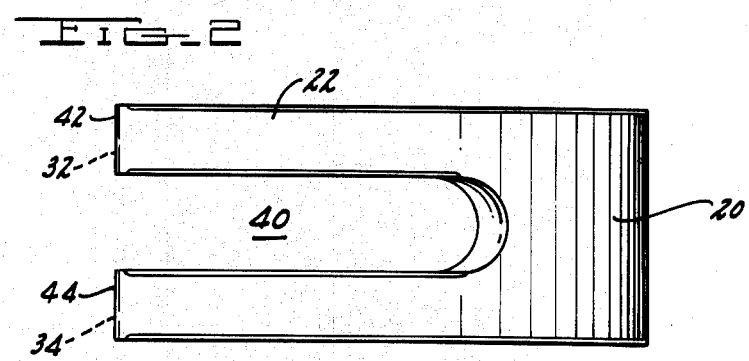
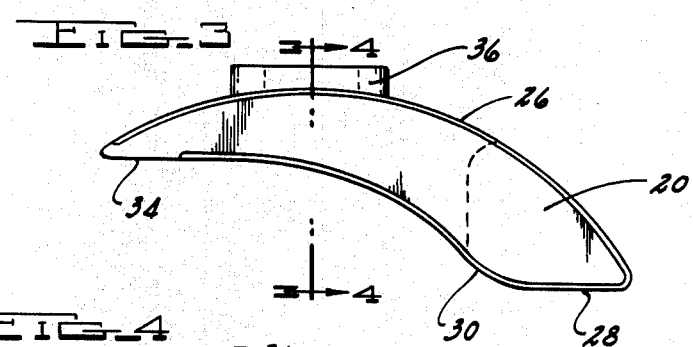
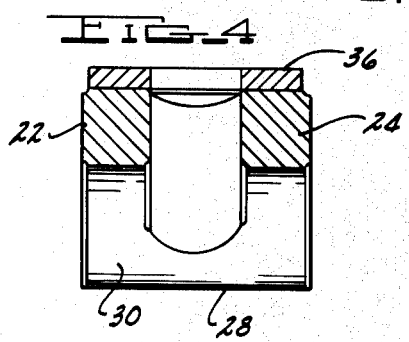
INVENTOR
HECTOR SEQUIN
SMITH, OLSEN & KOTTS
ATTORNEYS

United States Patent Office 3,227,438
Patented Jan. 4, 1966

3,227,438
MACHINE CLAMP
Hector Sequin, 488 S. Alkire St., Denver, Colo.
Continuation of application Ser. No. 513,673, June 7, 1955, and application Ser. No. 71,202, Nov. 23, 1960. This application Aug. 27, 1964, Ser. No. 394,376
3 Claims. (Cl. 269—94)

The present application is a continuation of my copending application Serial Number 71,202, filed November 23, 1960 and Serial Number 513,673, filed June 7, 1955 and now abandoned, and relates to new and useful improvements in machine clamps and more particularly to a counterweighted hold down clamp. The clamp of the present invention is used for securely clamping an irregular shaped work piece in a pre-selected location on a machine bed.

Various devices have been used for this purpose throughout the years, however, none have been so practical as to replace the ordinary flat clamp. The flat clamp is used with a step block and shims, with the step block being built up to an equivalent height of the workpiece, which permits the clamp to be secured in a position parallel to the machine bed. Since this necessitates trial and error to establish a secure clamp, costs mount, while the production of parts is very slow.

It is therefore a primary object of the present invention to provide a new and unique one piece machine clamp which can be quickly positioned without the use of shims, which will adequately position a workpiece on a machine bed.

Another object of the invention is the provision of a machine clamp which is counterweighted for ease of operation and can be used on a wide variety of parts ranging from very thin to thick.

Still another object of the invention is the provision of a one-piece machine clamp which is inexpensive, while being durable and capable of being manufactured by modern mass production methods.

It is a further object of the invention to provide a machine clamp which is so constructed and arranged so that the work engaging surface will not damage the work surface, nor will the counterweighted portion thereof damage the machine bed, when the clamp is secured to a workpiece.

The above and other objects of the present invention can be accomplished by the provision of a counterweighted hold down clamp having two work holding fingers arranged in generally parallel relationship on one end thereof and a broad, heavy flat bottomed heel portion which forms a counter weight and engages the bed of the machine on which the clamp is used; said broad heavy heel having an arcuate pivotal section at the forward tangential edge of said heel portion; said parallel work holding fingers separated by a continuous open end slot which terminates forward of said heel portion and generally perpendicular to the flat bottom surface thereon; the top surfaces of each of said fingers being formed on a smooth sweeping arc, while a second arc is located intermediate the arcuate pivotal section and the flat work engaging surfaces on the work holding fingers; the flat surfaces thereof extend in generally parallel relationship to said flat bottom heel portion, while the forward edges of said work holding fingers are provided with an arcuate portion intermediate the respective surfaces, thereby reducing the possibility of damage to the workpiece on which the clamp is used; the broad, heavy, counterweighted heel portion on the underside of said work holding fingers extends approximately one third of the overall length of the clamp; said clamp secured in position with a nut and bolt, said nut engaging a pad having an arcuate portion thereon which is engaged with the upper arcuate surface of the work engaging fingers, while the bolt is disposed between the work holding fingers and the machine bed; engagement of one of said fingers with said workpiece through rotation of said nut clamping said workpiece securely in position.

Other objects of the invention will appear in the following description and appended claims, reference being had to the accompanying drawings which form a part of this specification, wherein like reference characters designate corresponding parts in the several views.

In the drawings:

FIGURE 1 is a fragmentary perspective view of a machine bed and a workpiece held in position thereon by the machine clamp of the present invention.

FIGURE 2 is a plan view of the machine clamp shown in FIGURE 1.

FIGURE 3 is an elevational view of the machine clamp and nut shown in FIGURE 1.

FIGURE 4 is a sectional view of the clamp taken along lines 4—4 of FIGURE 3.

Before explaining the present invention in detail, it is to be understood that the invention is not limited in its application to the details of construction and arrangement of parts illustrated in the drawings, since the invention is capable of other embodiments and of being practiced or carried out in various ways. Also, it is to be understood that the phraseology or terminology employed herein is for the purpose of description and not of limitation.

FIGURE 1 of the drawings illustrates a generally flat machine bed 10, having T-slots 12 and 14 longitudinally disposed therein. Said slots being adapted to accommodate the head of a bolt. A workpiece 16 is secured to the machine bed with the clamp 18 which embodies the present invention.

The general configuration of the machine clamp 18 is shown in FIGURES 1–3. The machine clamp of the present invention has a wide, heavy, counterweighted heel portion 20 and a pair of parallel work holding fingers 22 and 24 which extend outwardly therefrom. The upper surface of the heel portion and the upper surface of the work holding fingers 22 and 24 tangentially blend into a smooth, uninterrupted curve as indicated at 26. The bottom surface 28 of the heavy counterweighted heel is generally flat, while the forward edge thereof is provided with a portion 30 which tangentially intersects the underside of the clamp. The underside of the fingers 22 and 24 are curved and tangentially blend with the cylindrical portion 30 to provide a smooth uninterrupted arc.

Flat work engaging tips 32 and 34 are provided at the ends of each of the fingers 22 and 24 to hold a workpiece 16. A threaded nut 39 is provided for positioning and securing the clamp to a workpiece. A pad 36 is disposed beneath said nut 39. Said pad 36 has a concave underside of substantially the same configuration as the top of each of the fingers, while the top of the pad is generally flat. Thus, when the clamp is pivoted about the cylindrical portion 30 of the counterweighted base 20, the threaded nut 39 can be operatively positioned in substantially perpendicular relationship to the bolt 38, to clamp the workpiece in position.

As illustrated in FIGURE 1, the bolt 38 is disposed between the parallel fingers 22 and 24 in the slot 40, the head end being in the T-slot, while the threaded end is through the pad 36 and has the threaded nut 39 positioned thereabout.

In use, the broad heavy, counterweighted heel 28 of the machine clamp is placed in contact with the generally flat bed of the machine 10. The counterweighted heel portion maintaining the parallel relationship of the underside of the work holding fingers 22 and 24, with the machine bed 10. Therefore, when the clamp is positioned on the bed of the machine, and the nut 39 turned down securely, the workpiece is efficiently clamped in position. Since the tips 42 and 44 are rounded, no damage will result when contact is made with the workpiece, nor will any damage occur on the bed of the machine as a result of the contact of the portion 30. The clamp of the present invention will accommodate all clamping requirements, since the gripping surfaces provided are in direct proportion to the thickness of the workpiece 16.

From the foregoing description, it will be apparent that the present invention is superior to any clamps either present or past, that the clamp of the present invention can be used to clamp any thickness workpiece without the use of shims or step blocks and the clamp of the present invention when used is not only durable, but will minimize the time of application which will ultimtaely reduce the price of the end product manufactured.

Having thus described my invention, I claim:

1. In a machine clamp, the combination of, a broad counterweighted heel portion having a generally flat bottom with front and rear edges thereon;
    a pair of work holding fingers extending from said counterweighted heel portion;
    said work holding fingers located in substantially parallel relationship and having a slot therebetween;
    said slot terminating at the heel portion in perpendicular relationship to the flat bottom portion thereof;
    said work holding fingers having a curved upper and a curved lower surface thereon which surfaces intersect in tangential relationship the curved portions on the front and rear edges of the broad counterweighted heel;
    the upper surface of said work holding fingers have positioned thereon a pad having a curved underside cooperable with the upper surface of said work holding fingers, the top of said pad being flat to cooperate with the under surface of a threaded nut secured to a bolt positioned between said work holding fingers and secured to a machine base.

2. In a counterweighted work holding clamp, the combination of,
    a broad counterweighted, flat bottomed heel portion having two work holding fingers which extend therefrom;
    said broad, counterweighted heel portion having an arcuate pivotal section at the forward tangential edge thereof;
    said work holding fingers having a continuous open end slot which terminates forward of said heel portion and in generally perpendicular relationship to the flat bottom surface thereof;
    a top and bottom surface on said work holding fingers;
    the top surface of each of said work holding fingers is arcuate;
    the bottom surface of said work holding fingers tangentially intersects the arcuate pivotal section on the heel portion and the forward edge of the work holding fingers;
    the forward edges of the work holding fingers are provided with an arcuate portion intermediate the respective curved surfaces thereof, thereby reducing the possibility of damage to the workpiece on which the clamp is used.

3. A clamp as in claim 2, wherein said broad counterweighted heel portion extends approximately one third of the overall length of the clamp.

References Cited by the Examiner

UNITED STATES PATENTS

| 1,801,222 | 4/1931 | Cayo | 269—93 |
| 2,365,079 | 12/1944 | Huber | 269—93 X |

FOREIGN PATENTS

| 107,926 | 7/1917 | Great Britain. |

WILLIAM W. DYER, Jr., *Primary Examiner.*
ROBERT C. RIORDON, *Examiner.*